United States Patent [19]
Luciani et al.

[11] Patent Number: 4,946,111
[45] Date of Patent: Aug. 7, 1990

[54] METHODS AND APPARATUS FOR WINDING STATORS FOR ELECTRIC MOTORS AND THE LIKE

[75] Inventors: Sabatino Luciani, Sesto Fiorentino; Massimo Ponzio, Gambassi Terme, both of Italy

[73] Assignee: AXIS USA, Inc., Peabody, Mass.

[21] Appl. No.: 353,486

[22] Filed: May 18, 1989

[51] Int. Cl.$^5$ .............................................. H02K 15/02
[52] U.S. Cl. ..................................... 242/1.1 R; 29/596
[58] Field of Search .................. 242/1.1 R, 7.02, 7.03, 242/7.05 B; 29/596, 605

[56] References Cited

U.S. PATENT DOCUMENTS

| | | | |
|---|---|---|---|
| 2,949,789 | 8/1960 | Eminger | 242/1.1 R X |
| 3,678,766 | 7/1972 | Geber | 242/1.1 R X |
| 3,785,212 | 1/1974 | Eminger | 242/1.1 R X |
| 4,361,056 | 11/1982 | George | 242/1.1 R X |
| 4,538,770 | 9/1985 | Sedgewick | 242/1.1 R |
| 4,612,702 | 9/1986 | Wheeler | 29/596 |
| 4,634,063 | 1/1987 | Watanabe et al. | 242/1.1 R |
| 4,762,283 | 8/1988 | Sabatino | 242/1.1 R |
| 4,858,835 | 8/1989 | Luciani et al. | 242/1.1 R X |

FOREIGN PATENT DOCUMENTS 2068787 8/1981 United Kingdom .

*Primary Examiner*—Katherine A. Matecki
*Attorney, Agent, or Firm*—Eric C. Woglom; Robert R. Jackson

[57] ABSTRACT

The density, regularity, and efficiency of the coils wound on a stator (e.g., an electric motor stator) are improved by providing winding needle trajectories which tend to urge the wire to fill empty areas which may otherwise develop in the coils at the ends of the stator. The phase relationship between the oscillation and reciprocation components of needle motion is selected to optimize coil formation. In particular, each oscillation stroke is typically somewhat delayed (as compared to the prior apparatus) relative to the reversal of reciprocation direction. The reciprocation stroke length is also typically increased. Needle actuation apparatus in which adjustment of these parameters is facilitated is also disclosed.

16 Claims, 12 Drawing Sheets

FIG. 6
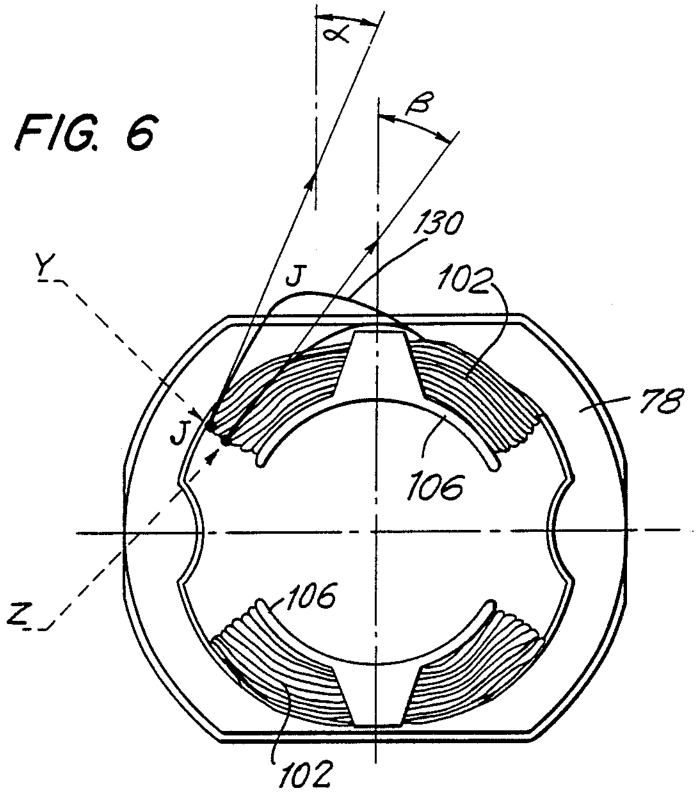
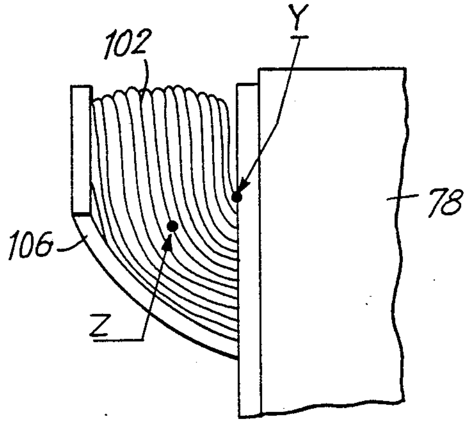
FIG. 7

METHODS AND APPARATUS FOR WINDING STATORS FOR ELECTRIC MOTORS AND THE LIKE

BACKGROUND OF THE INVENTION

This invention relates to methods and apparatus for applying the wire windings to stators for electric motors and similar electrical equipment (e.g., generators).

Although the invention will be explained in the context of winding electric motor stators, it will be understood that the invention is equally applicable to winding other types of stators (e.g., generator stators), and that the word stator as used herein is generic to all stators which can be wound using the methods and apparatus of this invention.

Commonly owned U.S. Pat. No. 4,858,835 (which is hereby incorporated by reference herein) shows apparatus for winding two-pole electric motor stators in which each of two wire-supply needles is alternately reciprocated longitudinally through the stator and oscillated from side to side relative to the stator to progressively build up a winding on each pole of the stator. This apparatus has been found to work well, but, in some situations, to need some improvement in the density and uniformity of the resulting windings. It has been found that this apparatus (and other similar apparatus which winds on the same general principle (see also Wheeler U.S. Pat. No. 4,612,702 and Luciani U.S. Pat. No. 4,762,283, both of which are also incorporated by reference herein)) may sometimes leave an empty area near the end of the stator after several layers of wire have been laid down. This empty area either does not fill up with wire at all, or fills up irregularly and unpredictably. Indeed, the overall winding may be undesirably irregular. The finished winding is therefore not as dense and efficient as it could be.

It is therefore an object of this invention to improve stator winding apparatus of the type shown in the above-mentioned patent application.

It is another object of this invention to provide methods and apparatus for winding stators with greater density resulting from more regular and more complete winding.

It is still another object of this invention to provide methods and apparatus for winding stators which can achieve greater uniformity and regularity, and which methods and apparatus are readily adjusted to wind stators of various sizes and configurations.

SUMMARY OF THE INVENTION

These and other objects of the invention are accomplished in accordance with the principles of the invention by providing stator winding methods and apparatus in which (1) the length of the reciprocation stroke of the needle through the stator can be adjusted and (2) the phase of the needle oscillation at each end of the stator can be varied relative to the phase of the reciprocation. Whereas heretofore the oscillatory motion tended to be 180° out of phase with the reciprocatory motion (so that each rotation due to oscillation was "centered" relative to a reversal in the direction of reciprocation), in the present invention the reciprocation stroke is typically lengthened and the point at which the oscillation begins is typically farther from the stator than in the prior art. In addition, the point at which the reversal of reciprocation direction occurs is typically no longer coincident with the midpoint of the oscillation, but rather occurs at an adjustable point which is generally before the midpoint of oscillation. These changes make it possible to more exactly tailor the motion of the winding needles to that which provides optimum coil density and regularity. In particular, the extra length of wire withdrawn from the needle due to the greater distance from the stator at which the oscillation begins, combined with the different position at which the reversal in the direction of reciprocation begins, causes the extending wire to be biased toward contact with previously wound wire at a point which is closer to the end of the stator and radially farther out on the stator than it otherwise might contact the previously wound wire. Then, when the rotation due to oscillation begins, the wire tends to pivot or bend about this new point, which has the desirable tendency to promote depositing of the wire closer to the end of the stator than it might otherwise be deposited. This desirable tendency is enhanced by the fact that the reciprocation reversal is well underway during the latter portion of the oscillation, which promotes pulling the wire into the region close to the end of the stator. The result is a significant improvement in coil density and regularity. Apparatus for facilitating the foregoing phase shift between the oscillation and reciprocation is also disclosed.

Further features of the invention, its nature and various advantages will be more apparent from the accompanying drawings and the following detailed description of the preferred embodiments.

BRIEF DESCRIPTION OF THE DRAWINGS

FIG. 6 is an elevational view of the stator of FIG. 2 taken parallel to plane A in FIG. 2 which is useful in explaining the advantages of the modified wire paths of this invention.

FIG. 7 is a view similar to FIG. 4 useful in explaining the advantages of the modified needle trajectories and wire paths of this invention.

DETAILED DESCRIPTION OF THE PREFERRED EMBODIMENTS

Because some aspects of the present invention are illustrated as improvements to what is shown in U.S. Pat. No. 4,858,835, the same reference numbers (all less than 100) are used for elements which are shown in both that application and this application. Reference numbers greater than 100 are used for elements which are newly referenced in this application.

While this invention may also be of use in winding electric motor stators with the conventionally employed temporary winding forms or shrouds, the invention is particularly useful when winding without such elements (as is discussed, for example, in the above-mentioned and incorporated Wheeler patent). Accordingly, the accompanying drawings show winding without the use of temporary winding forms so that the wire to be wound passes directly from the end of the wire supply needle to the coil being wound.

Figure 1:
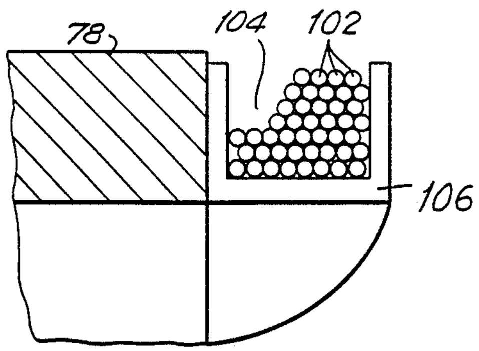
FIG. 1 is a simplified, partial, sectional view (taken parallel to plane C in FIG. 2) of a stator illustrating the problem which is solved by this invention.
Figure 2:
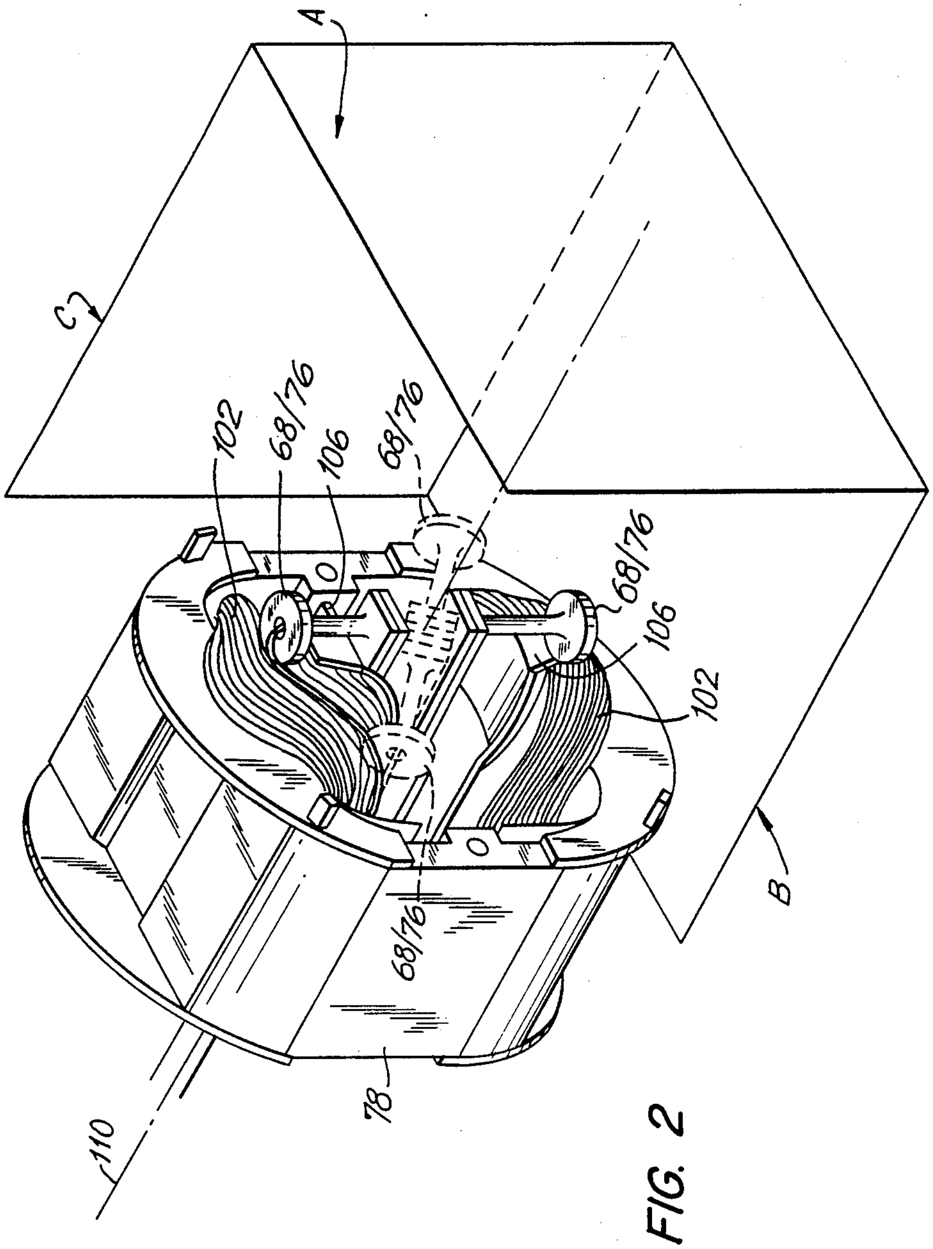
FIG. 2 is a perspective view of a stator during winding, and shows three reference planes parallel to which other views are taken.

FIG. 1 illustrates the problem which may arise in using the apparatus shown in U.S. Pat. No. 4,858,835 (or other apparatus operating on a generally similar principle). As winding of coil 102 proceeds, an empty area 104 may tend to develop inside coil holder 106 near the end of stator 78. To facilitate discussion of this problem and its solution in accordance with this invention, FIG. 2 shows three orthogonal planes, A, B, and C parallel to which it is convenient to take views of the end of a typical stator 78. Plane A is perpendicular to the longitudinal axis 110 of stator 78. Plane B is perpendicular to an axis passing vertically through both poles of the stator. Plane C is perpendicular to a horizontal transverse axis passing between the two poles of the stator.

Figure 3:
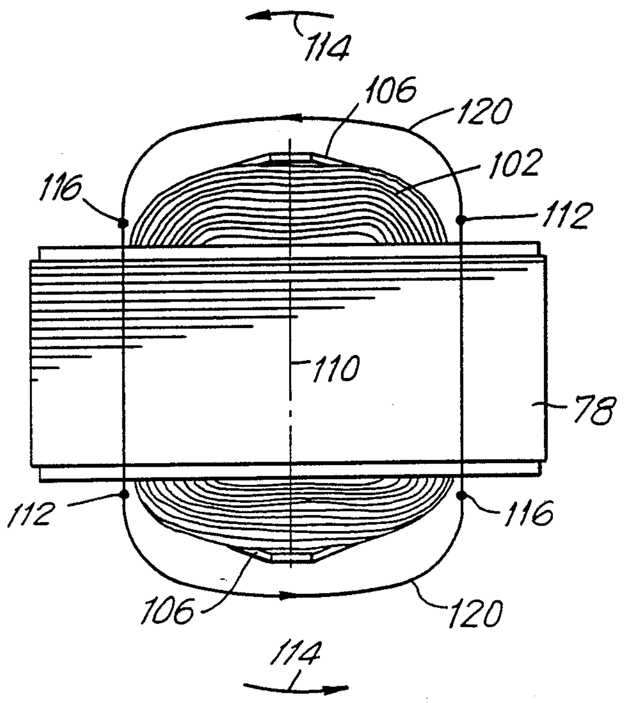
FIG. 3 is an elevational view of the stator of FIG. 2 taken parallel to plane B in FIG. 2.
Figure 4:
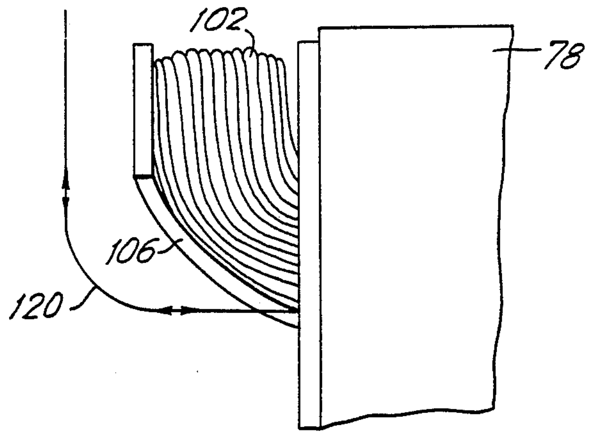
FIG. 4 is an elevational view of the stator of FIG. 2 taken parallel to plane C in FIG. 2.

FIGS. 3 and 4 (taken parallel to planes B and C, respectively, in FIG. 2) show typical (upper pole only) winding paths produced by apparatus of the type shown in U.S. Pat. No. 4,858,835. The end of the upper needle (68/76 in FIG. 2) emerges from the end of stator 78 at about the location of point 112 in FIG. 3. As the longitudinal reciprocation concludes, the end of the needle begins to rotate about the longitudinal axis of the needle in the direction indicated by arrow 114 in FIG. 3. During the latter part of this rotation ("oscillation"), needle 68/76 begins to reciprocate back toward stator 78 so that when the rotation is finished, the end of the needle can pass through stator 78 along an axis which includes point 116 in FIG. 3.

FIGS. 3 and 4 reveal that in the prior apparatus the reciprocation (i.e., the longitudinal motion parallel to longitudinal axis 110) and the oscillation (i.e., the rotational motion at each end of the stator) are typically 180° out of phase with one another. In particular, most of each rotation occurs while there is little or no motion due to reciprocation. Similarly, most of each reciprocation occurs while there is little or no rotational motion due to oscillation. Moreover, each rotation due to oscillation is typically "centered" on the reversal in the direction of reciprocation. Thus, the path 120 traversed by the end of needle 68/76 at each end of the stator is substantially symmetrical about a central vertical axis, as well as longitudinal axis 110 (FIG. 4). It has been found that needle trajectories of the type described above tend to leave an empty area 104 (FIG. 1) in the coil as the winding of the coil proceeds. This empty area tends to occur near the end of the stator, and it results in coils of less than optimal density and efficiency.

Figure 5:
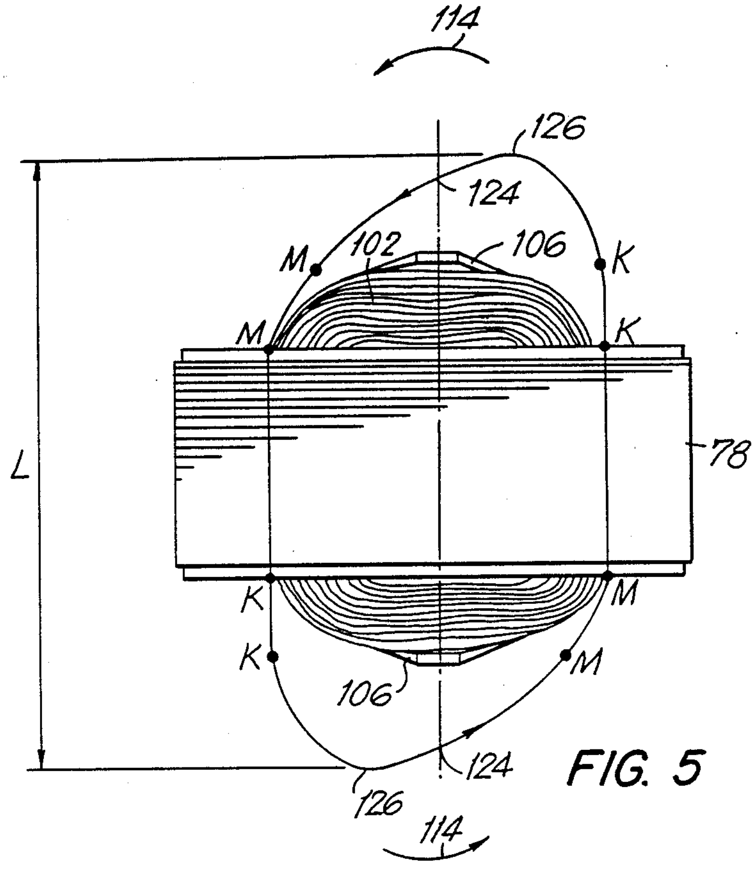
FIG. 5 is a view similar to FIG. 3 illustrating a modified needle trajactory in accordance with this invention.

This problem is solved in accordance with the present invention by altering the needle trajectory in the manner generally illustrated in FIG. 5. In particular, the midpoint 124 of each rotation due to oscillation occurs after (rather than coincident with) the reversal of reciprocation direction (at point 126 in FIG. 5). In addition, the length L of the reciprocation stroke is preferably increased. As a result of these two changes, the wire tends to emanate from the needle along a path like path 130 in FIG. 6. This has a tendency to move the point at which the wire emerging from the end of the stator contacts the previously deposited windings from a contact point like contact E in the prior apparatus to a contact point like contact Y which is both radially farther out and closer to the end of the stator (see also FIGS. 7 and 8). Contact Y (or contact Z in the prior apparatus) is the point at which the wire being deposited starts to pivot or bend in order to pass around the end of the stator through coil holder 106. Urging contact Y radially outward and closer to the end of the stator in the manner described above more favorably disposes the wire for depositing in empty area 104 in FIG. 1.

Figure 9:
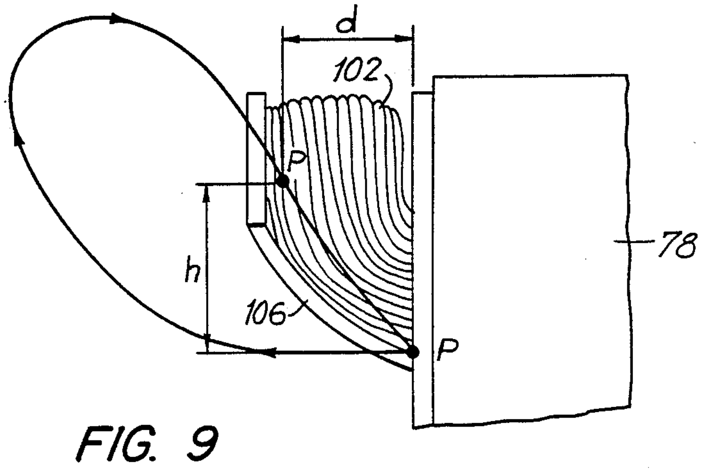
FIG. 9 is another view similar to FIG. 4 useful in explaining the advantages of the modified needle trajectories and wire paths of this invention.

As the rotation due to oscillation continues, the return reciprocation stroke begins at a point which is before the oscillation midpoint. This tends to bring the wire in over the previously deposited windings (see FIG. 9) and to cause it to be pulled down into empty area 104 as the needle passes back through the stator. Thus the foregoing changes in needle trajectory promote the filling of otherwise empty area 104. This in turn greatly improves the density, regularity, and efficiency of the resulting coils.

Figure 10B:
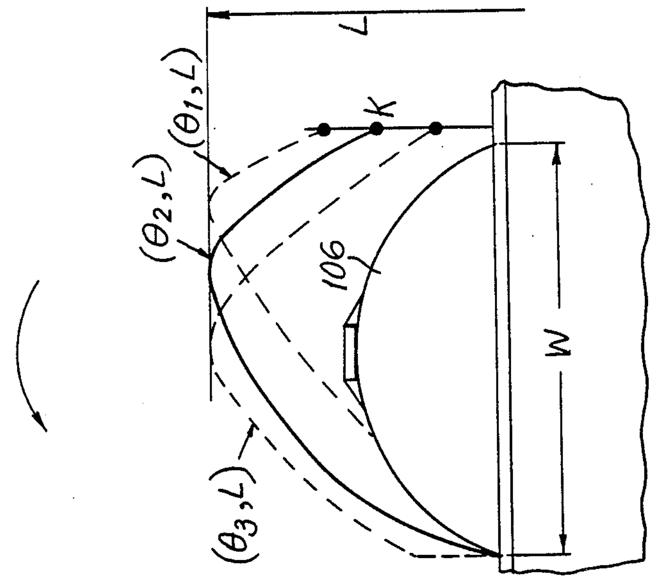
FIGS. 10*a* and 10*b* are views similar to portions of FIG. 3 showing various modifications of needle trajectories in accordance with this invention for use with stator components of different sizes.
Figure 10A:
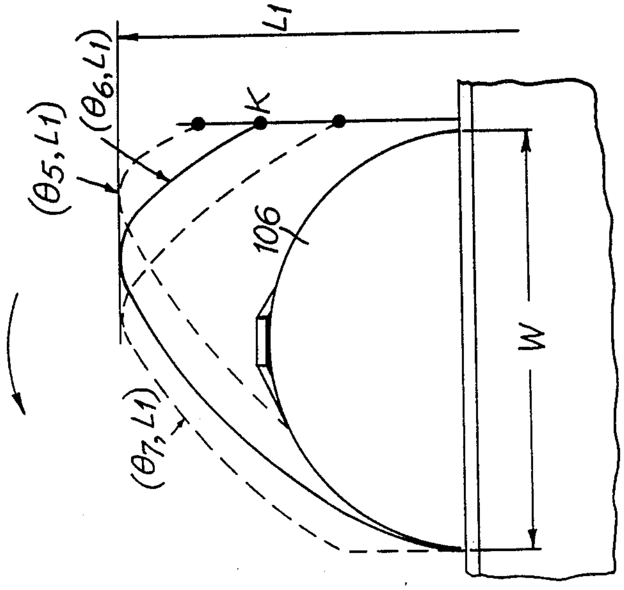

FIGS. 10a and 10b illustrate the point that various phase shifts Θ between the oscillation and reciprocation motions, together with various stroke lengths L, can be used to provide the optimal needle trajectory (shown in solid lines in each case) for coil holders 106 of various sizes on stators of a given diameter (related to depicted dimension W).

Figure 11:
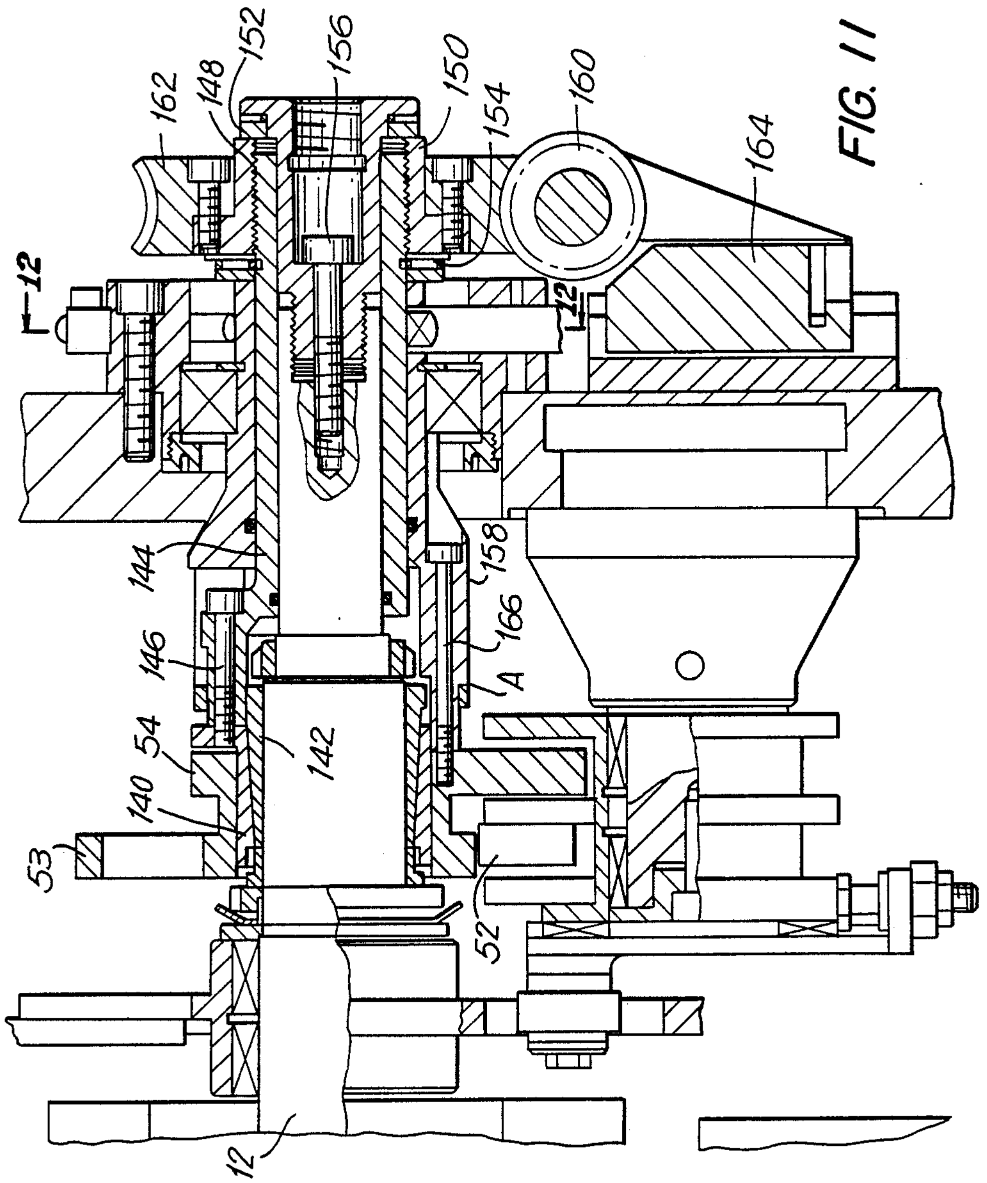
FIG. 11 is a partial sectional view of needle actuation apparatus of the type shown in U.S. Pat. No. 4,858,835, showing how that apparatus can be modified in accordance with this invention to facilitate providing the modified needle trajectories of this invention.
Figure 12:
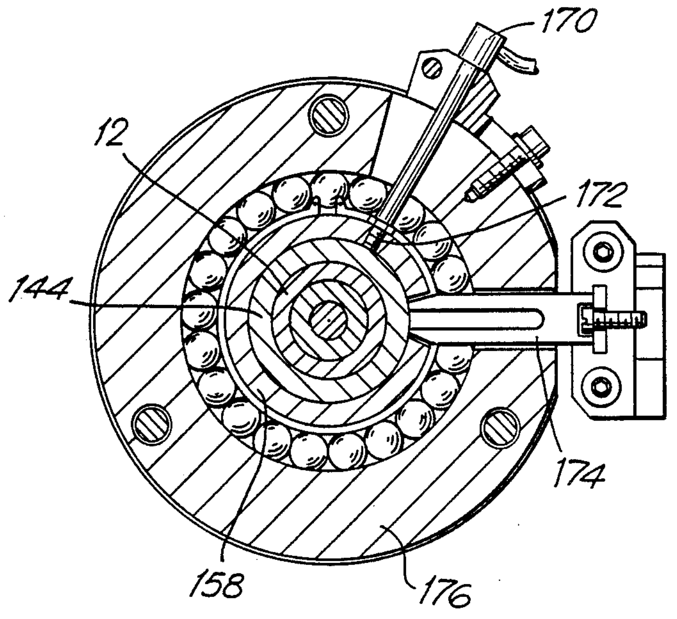
FIG. 12 is a partial sectional view taken along the line 12—12 in FIG. 11.

FIGS. 11 and 12 show how apparatus of the type shown in U.S. Pat. No. 4,858,835 can be modified in accordance with this invention to allow the oscillation-reciprocation phase relationship to be changed as described above. The apparatus shown in U.S. Pat. No. 4,858,835 already includes the ability to change the length of the reciprocation stroke L (as well as the length of the oscillation stroke). Only the portion of the U.S. Pat. No. 4,858,835 apparatus which is affected by the modifications of the present invention is shown again herein, and, as has been mentioned, the same reference numbers (all less than 100) are used herein for elements which are substantially unchanged from the prior apparatus.

Oscillation of the needles is produced by pins or idler rollers 52 which bear on cams 53 and 54. During normal operation of the apparatus, cams 53 and 54 rotate with continuously revolving shaft 12. The rotation of shaft 12 is also the element from which the reciprocation of the needles is derived. Accordingly, the angular position of cams 53 and 54 relative to shaft 12 determines the phase relationship between the oscillation and reciprocation.

Cams 53 and 54 are normally locked to shaft 12 by releasable clutch means which is engaged by pulling collar 140 to the right as viewed in FIG. 11 into wedging contact with complementary wedging collar 142. Wedging collar 142 is axially and rotationally fixed on shaft 12, but is circumferentially split in order to make it circumferentially elastic. Wedging collar 140 is normally pulled to the right as described above by sleeve 144, to which collar 140 is secured by bolts 146. Sleeve 144 is in turn pulled to the right by a threaded connection 148 between sleeve 144 and collar 150. Collar 150 is rotatable relative to sleeve 14 and shaft 12, but is axially fixed relative to shaft 12 by being captured between thrust bearings 152 and 154. Thrust bearing 152 is axially secured to the end of shaft 12 by the structure including bolt 156. Thrust bearing 154 is axially positioned relative to shaft 12 by sleeve 158, a leftward facing surface of which bears on a rightward facing surface of wedging collar 142 at contact A. When required, collar 150 can be rotated by raising worm gear 160 so that it engages gear 162 (as shown) which is mounted on collar 150. Worm gear 160 is mounted on slide 164 which is raised or lowered, e.g., by a conventional pneumatic or hydraulic actuator, not shown. Worm gear 160 is rotated by a conventional motor drive, also not shown.

When it is desired to change the angular position of cams 53 and 54 relative to shaft 12, shaft 12 is rotated slowly until proximity switch 170 (FIG. 12) detects a stud 172 which is provided merely as a marker at a predetermined angular position on sleeve 158. The rotation of shaft 12 is then stopped, and an actuator (e.g., a conventional pneumatic or hydraulic actuator, not shown) causes pin 174 to extend from stationary collar 176 into an aperture in sleeve 158. This prevents sleeve 158 (and cams 53 and 54 which are bolted to sleeve 158 at 166) from rotating.

Slide 164 is then raised so that worm gear 160 engages gear 162. Worm gear 160 is rotated, thereby rotating gear 162 and causing sleeve 144 and collar 140 to move to the left as viewed in FIG. 11 due to the threaded connection 148 between elements 144 and 150. (Sleeve 144 is prevented from rotating with elements 150 and 162 because the extensions of sleeve 144 through which bolts 146 pass cannot rotate past the extensions of sleeve 158 through which bolts 166 pass. Sleeve 158 is, of course, rotationally fixed by pin 174 as described above.) The leftward motion of collar 140 uncouples cams 53 and 54 from shaft 12. This allows shaft 12 to be rotated, while pin 174 holds cams 53 and 54 stationary at a known angular position. Shaft 12 is then rotated slowly again until cams 53 and 54 have the desired new angular position relative to that shaft.

When the desired new angular relationship between cams 53/54 and shaft 12 has been achieved, shaft 12 is stopped again. Worm gear 160 is rotated in the opposite direction to cause collar 140 to move to the right, thereby relocking cams 53/54 to shaft 12. Slide 164 is then lowered to disengage worm gear 160 from gear 162, and pin 174 is withdrawn from the aperture in sleeve 158. The apparatus is now ready to resume stator coil winding with a new phase relationship between the oscillation and reciprocation components of needle motion.

Figure 8:
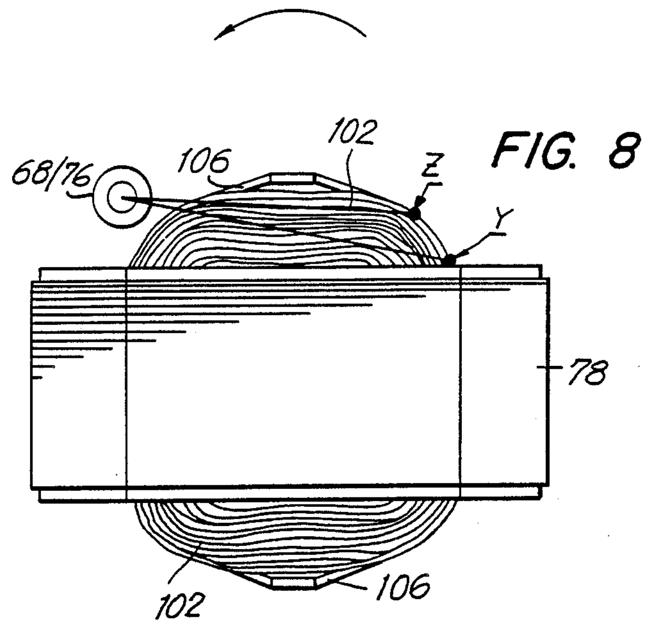
FIG. 8 is another view similar to FIG. 3 useful in explaining the advantages of the modified needle trajectories and wire paths of this invention.

It should be noted that because the present invention does not affect the way in which the needles are connected to the needle actuating apparatus, either the split needle arrangement shown in FIGS. 7 and 8 of U.S. Pat. No. 4,858,835, or the parallel needle arrangement shown in FIGS. 9–11 of that application can be used with the improvements of this invention.

It will be understood that the foregoing is merely illustrative of the invention, and that various modifications can be made by those skilled in the art without departing from the scope and spirit of the invention. For example, the apparatus modifications shown in FIGS. 11 and 12 are particularly suitable for the apparatus shown in U.S. Pat. No. 4,858,835, but other means for establishing a desired phase relationship between the reciprocation and oscillation components of needle motion might be preferable if other needle actuation apparatus was being employed.

What is claimed:

1. Apparatus for winding a coil of wire on a pole of a stator having a central longitudinal axis and axially opposite end faces which are transverse to said longitudinal axis, said apparatus comprising:
   - a needle having an end from which the wire to be wound on said pole is drawn; and
   - means for causing said end of said needle (1) to reciprocate longitudinally through said stator along reciprocation strokes having axially spaced reciprocation stroke endpoints, each of said reciprocation stroke endpoints being outside of said stator adjacent a respective one of said end faces, and (2) to rotationally oscillate along oscillation strokes disposed about said longitudinal axis, each oscillation stroke taking place substantially while said end of said needle is outside the stator adjacent each end face, and each oscillation stroke having rotationally spaced oscillation stroke endpoints and an oscillation stroke midpoint which is midway between said oscillation stroke endpoints, said means for causing comprising:
   - means for allowing relative adjustment of said reciprocation and oscillation strokes to that said oscillation stroke midpoints can be made noncoincident with said reciprocation stroke endpoints.

2. The apparatus defined in claim 1 wherein said reciprocation and oscillation strokes are relatively adjusted by said means for allowing so that said end of said needle reaches each reciprocation stroke endpoint and begins to reciprocate back toward the reciprocation stroke endpoint adjacent the opposite end face before said end of said needle passes through the midpoint of the oscillation stroke which is taking place when said end of said needle reaches said each reciprocation stroke endpoint.

3. The apparatus defined in claim 1 wherein each oscillation stroke takes place as said end of said needle approaches, reaches, and then begins to move away from an associated reciprocation stroke endpoint, and wherein said reciprocation and oscillation strokes are relatively adjusted by said means for allowing so that said end of said needle passes through the midpoint of said each oscillation stroke as said end of said needle is moving away from said associated reciprocation stroke endpoint.

4. The apparatus defined in claim 1 further comprising a rotating shaft; wherein said means for causing comprises (a) first means for converting rotation of said shaft to reciprocation of said end of said needle such that the rotational position of said shaft determines the location of said end of said needle along said reciprocation strokes, and (b) second means of converting rotation of said shaft to oscillation of said end of said needle such that the rotational position of said shaft determines the location of said end of said needle having said oscillation strokes; and wherein said means for allowing comprises releasable clutch means operatively connected between said shaft and said second means for allowing the relationship between the rotational position of said shaft and the location of said end of said needle along said oscillation strokes to be changed.

5. The apparatus defined in claim 4 further comprising:

means for holding said second means stationary while said clutch means is released and said shaft is rotated to change the relationship between the rotational position of said shaft and the location of said end of said needle along said oscillation strokes.

6. The apparatus defined in claim 5 wherein said second means rotates in response to rotation of said shaft, and wherein said means for holding comprises:

means for detecting the angular position of said second means and for producing an output indication when said second means is in a predetermined angular position; and means responsive to said output indication for releasably locking said second means in said predetermined angular position.

7. The apparatus defined in claim 6 further comprising:

means for releasing said clutch means while said means responsive to said output indication locks said second means in said predetermined angular position; and means for rotating said shaft while said means for releasing said clutch means releases said clutch means to change the angular position of said shaft relative to said second means.

8. The apparatus defined in claim 7 further comprising:

means responsive to the angular position of said shaft for stopping said means for rotating said shaft when said shaft has a desired angular position relative to said predetermined angular position of said second means; and means for engaging said clutch means to lock said shaft in said desired angular position relative to said predetermined angular position of said second means.

9. The apparatus defined in any one of claims 1 through 8 wherein said wire to be wound on said pole passes directly from said end of said needle to said coil without the use of temporary winding forms.

10. The method of winding a coil of wire on a pole of a stator having a central longitudinal axis and axially opposite end faces which are transverse to said longitudinal axis, said method comprising the steps of:

providing a needle having an end from which the wire to be wound is drawn; and causing said end of said needle (1) to reciprocate longitudinally through said stator along reciprocation strokes having axially spaced reciprocation stroke endpoints, each of said reciprocation stroke endpoints being outside of said stator adjacent a respective one of said end faces, and (2) to rotationally oscillate along oscillation strokes disposed about said longitudinal axis, each oscillation stroke taking place substantially while said end of said needle is outside the stator adjacent each end face, and each oscillation stroke having rotationally spaced oscillation stroke endpoints and an oscillation stroke midpoint which is midway between said oscillation stroke endpoints, said causing step comprising the step of:

adjusting said reciprocation and oscillation strokes relative to one another so that said oscillation stroke midpoints are noncoincident with said reciprocation stroke endpoints.

11. The method defined in claim 10 wherein said reciprocation and oscillation strokes are adjusted relative to one another in said adjusting step so that said end of said needle reaches each reciprocation stroke endpoint and begins to reciprocate back toward the reciprocation stroke endpoint adjacent the opposite end face before said end of said needle passes through the midpoint of the oscillation stroke which is taking place when said end of said needle reaches said each reciprocation stroke endpoint.

12. The method defined in claim 10 wherein each oscillation stroke takes place as said end of said needle approaches, reaches, and then begins to move away from an associated reciprocation stroke endpoint, and wherein said reciprocation and oscillation strokes are adjusted relative to one another in said adjusting step so that said end of said needle passes through the midpoint of each oscillation stroke as said end of said needle is moving away from said associated reciprocation stroke endpoint.

13. The method defined in claim 10 wherein said reciprocation and oscillation strokes are both powered from a rotating shaft, said oscillation strokes being produced by oscillating means which are releasably coupled to said shaft such that the angular position of said shaft relative to said oscillating means determines the location of said end of said needle along said oscillation strokes, and wherein said method further comprises the steps of:

uncoupling said oscillating means from said shaft;

rotating said shaft to change the angular position of said shaft relative to said oscillating means; and recoupling said oscillation means to said shaft.

14. The method defined in claim 13 further comprising the step of:

rotating said shaft until said oscillating means has a predetermined angular position prior to performing said uncoupling step.

15. The method defined in claim 14 further comprising the step of:

holding said oscillating means in said predetermined angular position while said oscillating means is uncoupled from said shaft.

16. The method defined in any one of claims 10 through 15 wherein said wire to be wound on said pole passes directly from said one of said needle to said coil without the use of temporary winding forms.

* * * * *

UNITED STATES PATENT AND TRADEMARK OFFICE

CERTIFICATE OF CORRECTION

PATENT NO. : 4,946,111

DATED : AUGUST 7, 1990

INVENTOR(S) : SABATINO LUCIANI AND MASSIMO PONZIO

It is certified that error appears in the above-identified patent and that said Letters Patent is hereby corrected as shown below:

| Column | Line | Correction |
|---|---|---|
| 4 | 13 | "E" should be --Z--. |
| 8 | 44 | "oscillation" should be --oscillating--. |
| 8 | 57 | "one" should be --end--. |

Signed and Sealed this

Tenth Day of August, 1993

Attest:

MICHAEL K. KIRK

Attesting Officer

*Acting Commissioner of Patents and Trademarks*